(12) United States Patent
Takeyama

(10) Patent No.: US 8,470,490 B2
(45) Date of Patent: Jun. 25, 2013

(54) FUEL CELL STACK

(75) Inventor: Makoto Takeyama, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 288 days.

(21) Appl. No.: 12/747,315

(22) PCT Filed: Nov. 21, 2008

(86) PCT No.: PCT/JP2008/071211
§ 371 (c)(1),
(2), (4) Date: Jun. 10, 2010

(87) PCT Pub. No.: WO2009/075178
PCT Pub. Date: Jun. 18, 2009

(65) Prior Publication Data
US 2010/0291458 A1    Nov. 18, 2010

(30) Foreign Application Priority Data

Dec. 11, 2007    (JP) ................. 2007-319355

(51) Int. Cl.
*H01M 8/02*    (2006.01)
*H01M 8/04*    (2006.01)

(52) U.S. Cl.
USPC ........................................ 429/458

(58) Field of Classification Search
USPC ................................. 429/400–535
See application file for complete search history.

(56) References Cited

U.S. PATENT DOCUMENTS

2006/0240307 A1 * 10/2006 Suh ................................ 429/37

FOREIGN PATENT DOCUMENTS

| CN | 101009379 A | | 8/2007 |
|---|---|---|---|
| JP | 5-174862 A | | 7/1993 |
| JP | 2000-012050 A | * | 1/2000 |
| JP | 2003-092130 A | | 3/2003 |
| JP | 2004-146303 A | | 5/2004 |
| JP | 2004-207106 A | | 7/2004 |
| JP | 2004-335307 A | | 11/2004 |
| JP | 2005-130545 A | | 5/2005 |
| JP | 2006-185868 A | | 7/2006 |
| JP | 2007-052948 A | | 3/2007 |
| JP | 2007-073509 A | | 3/2007 |

OTHER PUBLICATIONS

Hado et al. (JP 2004-146303 A). May 20, 2004. English machine translation.*

(Continued)

*Primary Examiner* — Basia Ridley
*Assistant Examiner* — James Lee
(74) *Attorney, Agent, or Firm* — Kenyon & Kenyon LLP

(57) ABSTRACT

A fuel cell stack in which, even if the fuel cell stack is mounted in an inclined position, the performance of system components mounted on an end plate is maintained satisfactory. The fuel cell stack has a cell stack body formed by stacking a plurality of fuel battery single cells, and a pair of end plates for holding the cell stack body from respective sides in the stack direction. System components are mounted on one end plate. One end plate has a stack-facing surface facing the cell stack body and also has a system component mounting surface on the opposite side of the stack-facing surface. The system component mounting surface is inclined relative to the facing surface by an inclination angle so that, when the fuel cell stack is placed such that manifolds decline toward the one end plate, the system component mounting surface is vertical.

4 Claims, 5 Drawing Sheets

OTHER PUBLICATIONS

Yoshimura. (JP 2000-012050 A). Jan. 14, 2000. English machine translation.*

Office Action issued May 2, 2012 in CN Patent Application No. 200880112777.X and English translation thereof.

* cited by examiner

A-A CROSS SECTION

FUEL CELL STACK

This is a 371 national phase application of PCT/JP2008/071211 filed 21 Nov. 2008, claiming priority to Japanese Patent Application No. JP 2007-319355 filed 11 Dec. 2007, the contents of which are incorporated herein by reference.

TECHNICAL FIELD

The present invention relates to a fuel cell stack, and in particular to a fuel cell stack which can maintain the performance of a system component which is mounted on an end plate even when the stack is placed in an inclined state.

BACKGROUND ART

A fuel cell stack has a structure wherein a plurality of basic structures (fuel battery single cells) each having an anode-side electrode, an electrolyte membrane, and a cathode-side electrode, are stacked and connected in series. The fuel battery single cell which is the basic structure has a structure wherein the anode-side electrode is placed on one surface of the electrolyte membrane comprising a polymer ion exchange membrane, the cathode-side electrode is placed on the other surface thereof, and the resulting structure is sandwiched by separators. A plurality of the fuel battery single cells each having such a structure are stacked and connected in series, and the stacked structure of the plurality of fuel battery single cells is sandwiched from both sides in the stack direction by a pair of current-collector plates, a pair of insulating plates, and a pair of end plates, so that the obtained structure is used as a fuel cell stack which generates a high voltage.

Here, in each fuel battery single cell, a manifold hole is formed in the electrolyte membrane and the separator. When the anode-side electrode, electrolyte membrane, and cathode-side electrode are sandwiched by the separators, the manifold holes of the electrolyte membrane and the separators are connected, and there is created a fuel battery single cell in which a part of a manifold to be described later is formed. When a plurality of the fuel battery single cells are stacked and connected in series to create the fuel cell stack, the manifold holes are connected between the fuel battery single cells. In other words, the parts of the manifold to be described later formed in the fuel battery single cells are connected. With this structure, in the fuel cell stack created by the stack of the fuel battery single cells, a manifold for supplying or discharging a fuel gas or an oxidizing agent gas between the outside of the fuel cell stack and the fuel battery single cells, and a manifold for supplying or discharging a coolant (for example, cooling water) between the outside of the fuel cell stack and the fuel battery single cells for suppressing temperature increase due to heat generation in the fuel battery single cells are formed through the fuel battery single cells in the direction of stacking.

In the fuel cell stack, with the above-described structure, the fuel gas and the oxidizing agent gas are supplied from a side of one end plate of the fuel cell stack through the manifold for gas supply to each fuel battery single cell, and, after the supply, gas is discharged from each fuel battery single cell to the manifold for gas discharge, and the discharged gas is discharged to the outside through the manifold for gas discharge from the side of the one end plate.

In the fuel battery single cell having the above-described structure, hydrogen, which serves as the fuel gas supplied to the anode side, and oxygen, which serves as the oxidizing agent gas supplied to the cathode side, electrochemically react through the electrolyte membrane, and water is produced. The produced water is drained from the fuel cell stack along with the discharge gas through the gas discharge manifold extending through the stack comprising the plurality of fuel battery single cells.

In order to achieve a superior performance for water discharge from the fuel cell stack, for example, Patent Documents 1-3 disclose placement of the fuel cell stack in an inclined manner with respect to a horizontal surface, to thereby, achieve a downward inclination in the manifold inside the stack.

Patent Document 1: JP 2004-207106 A
Patent Document 2: JP Hei 5-174862 A
Patent Document 3: JP 2004-146303 A

DISCLOSURE OF THE INVENTION

Problem to be Solved

However, when the fuel cell stack in which the ends of the cell stack structure are sandwiched by the endplates is inclined, system components such as, for example, a pump which is mounted on the end plate are also inclined, and there is a possibility that satisfactory performance of the system component cannot be achieved due to the inclined placement.

The present invention aims that the performance of the system component mounted on the end plate can be maintained even when the fuel cell stack is placed in an inclined state.

Means for Solving the Problem

According to the present invention, there is provided a fuel cell stack comprising a cell stack in which a plurality of fuel battery single cells are stacked, a pair of end plates which sandwich the cell stack from respective sides in a stack direction, and a system component which is mounted on one end plate, and in which there is formed a manifold extending in and through the cell stack in the stack direction and supplying and discharging a fuel gas or an oxidizing agent gas for each of the fuel battery single cells, wherein the one end plate has a stack-facing surface which faces the cell stack and a system component mounting surface on a side opposite of the stack-facing surface, and the system component mounting surface has an inclination angle with respect to the stack facing surface so that, when the fuel cell stack is placed such that the manifold has a downward inclination toward the one end plate, the system component mounting surface is oriented along a vertical direction.

Here, the "system component" includes components such as a pump, a pipe, a fuel gas injector, a discharge valve, a pressure sensor, etc.

In the fuel cell stack according to the present invention, preferably, the one end plate has a trapezoidal side surface or a trapezoidal cross section.

In the fuel cell stack according to the present invention, the one end plate may be composed of a flat plate having a constant thickness on a surface of which only a system component mounting portion is formed in a projected manner, and the system component mounting portion has a trapezoidal side surface or a trapezoidal cross section.

In the fuel cell stack according to the present invention, a lower side corner of the other endplate of the pair of endplates may be removed.

In the fuel cell stack according to the present invention, an upper side corner of the other end plate of the pair of end plates may be removed.

Advantages

According to the fuel cell stack of the present invention, because the system component mounting surface has an inclination angle with respect to the stack-facing surface so that, when the fuel cell stack is placed such that the manifold formed in and through the stack of the plurality of fuel battery single cells has a downward inclination toward the one end plate, the system component mounting surface of the one end plate is oriented along a vertical direction, the system component mounted on the one end plate can be used in a normal orientation regardless of the inclined placement of the fuel cell stack, and the performance of the system component can be maintained.

EXPLANATION OF REFERENCE NUMERALS

1 FUEL CELL SYSTEM; 10 FUEL CELL STACK; 12 VOLTAGE CONVERTER; 14 INVERTER; 16 MOTOR; 18 AVERAGING CAPACITOR; 20 HUMIDIFIER; 22 DILUTER; 24 FUEL GAS SUPPLY SECTION; 26 OXIDIZING AGENT GAS SUPPLY SECTION; 28 COOLANT CIRCULATING SECTION; 30 FUEL BATTERY SINGLE CELL; 32a, 32b CURRENT-COLLECTOR PLATE; 34a, 34b INSULATING PLATE; 36a, 36b END PLATE; 36c FLAT PLATE SECTION; 37a STACK-FACING SURFACE; 37b SYSTEM COMPONENT MOUNTING SURFACE; 38 CELL STACK; 39a LOWER SIDE CORNER; 39b UPPER SIDE CORNER; 40 STRAP-SHAPED MEMBER; 42a FUEL GAS SUPPLY MANIFOLD; 42b FUEL GAS DISCHARGE MANIFOLD; 44a OXIDIZING AGENT GAS SUPPLY MANIFOLD; 44b OXIDIZING AGENT GAS DISCHARGE MANIFOLD; 46a COOLANT SUPPLY MANIFOLD; 46b COOLANT DISCHARGE MANIFOLD; 48 PUMP; 50, 52, 54 PIPE; 56, 58, 60 PIPE-MOUNTING PORTION; 62 PUMP-MOUNTING PORTION; 70 STACK CASE; θ INCLINATION ANGLE

BEST MODE FOR CARRYING OUT THE INVENTION

A preferred embodiment of a fuel cell stack of the present invention will now be described in detail with reference to the accompanied drawings. The specific shapes, materials, numerical values, directions, etc. in this description are provided merely for exemplary purposes for facilitating understanding of the present invention, and may be suitably changed according to usage, objectives, specifications, etc.

Figure 1:
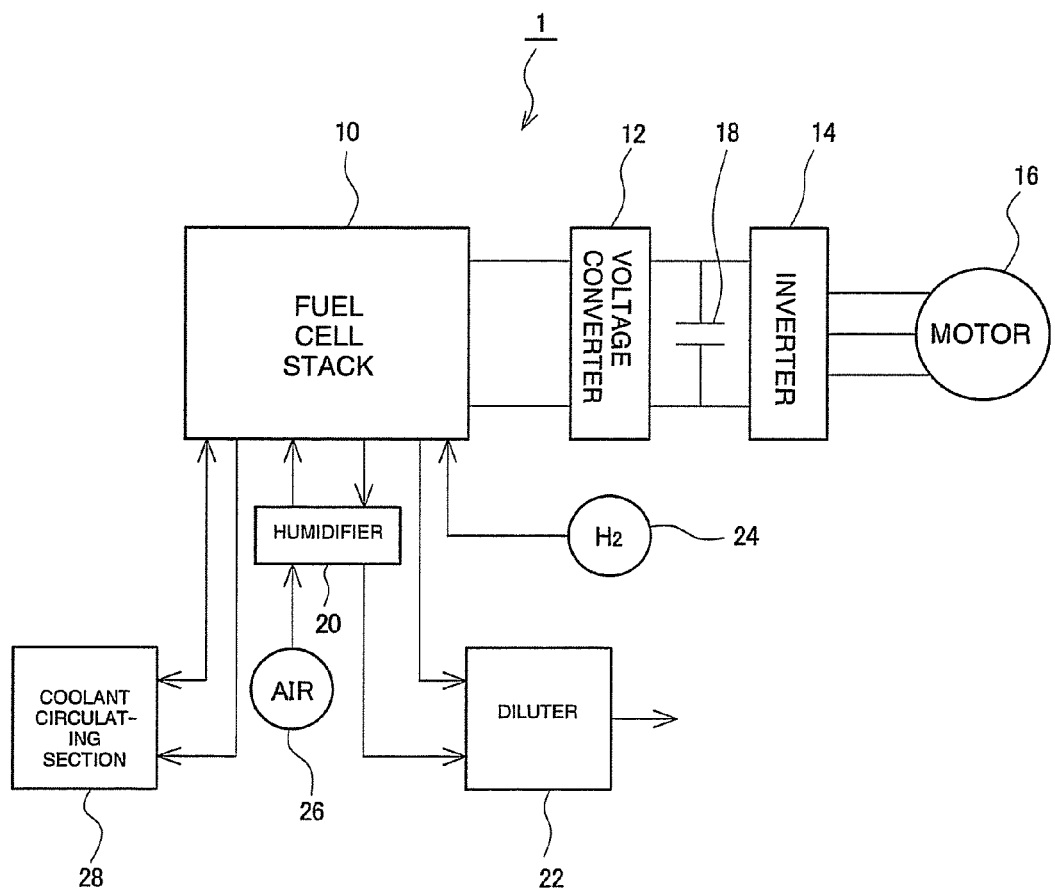
FIG. 1 is a block diagram schematically showing a fuel cell system having a fuel cell stack of a preferred embodiment of the present invention.

FIG. 1 is a block diagram schematically showing a structure of a fuel cell system 1 having a fuel cell stack 10 of a preferred embodiment of the present invention. The fuel cell system 1 comprises the fuel cell stack 10, a voltage converter 12, an inverter 14, a motor 16, an averaging capacitor 18, a humidifier 20, a diluter 22, a fuel gas supply section 24, an oxidizing agent gas supply section 26, and a coolant circulating section 28.

The fuel cell stack 10 generates power through an electrochemical reaction of, for example, hydrogen serving as a fuel gas and, for example, oxygen serving as an oxidizing agent gas through the electrolyte membrane, and outputs a direct current voltage to the voltage converter 12. The voltage converter 12 boosts the direct current voltage supplied from the fuel cell stack 10 as necessary, and supplies the boosted high-voltage direct current voltage through the averaging capacitor 18 to the inverter 14. The inverter 14 converts the high-voltage direct current voltage supplied from the voltage converter 12 into a three-phase alternating current voltage, and applies the same to, for example, a three-phase synchronization alternate current motor 16. The driving force of the motor 16 which rotates with application of voltage from the inverter 14 is used, for example, to drive a wheel of a vehicle such as an automobile.

Hydrogen is supplied as a fuel gas from the fuel gas supply section 24 to the fuel cell stack 10. The fuel gas supply section 24 may comprise, for example, a high-pressure hydrogen tank. On the other hand, air including oxygen as the oxidizing gas is taken in from the atmosphere by the oxidizing agent gas supply section 26, and is supplied through the humidifier 20 to the fuel cell stack 10. For the purpose of promoting the electrochemical reaction in the fuel cell stack 10, the air is sufficiently humidified when passing through the humidifier 20.

The waste hydrogen gas after supply for the electrochemical reaction with oxygen in the fuel cell stack 10 is sent from the fuel cell stack 10 to the diluter 22. The waste air after supply for the electrochemical reaction with hydrogen in the fuel cell stack 10, on the other hand, is discharged from the fuel cell stack 10 along with the water produced by the electrochemical reaction, and sent through the humidifier 20 to the diluter 22. In the humidifier 20, the product water including in the waste air is recovered by a porous structure provided in the humidifier 20 and is re-used for humidifying the air to be supplied to the fuel cell stack 10. In the diluter 22, the waste hydrogen gas is sufficiently mixed and diluted with the waste air, and is then discharged to the outside of the system.

The coolant circulating section 28 is for circulating cooling water serving as a coolant in the fuel cell stack 10, in order to cool the fuel cell stack 10 which is heated by the electrochemical reaction.

Figure 2:
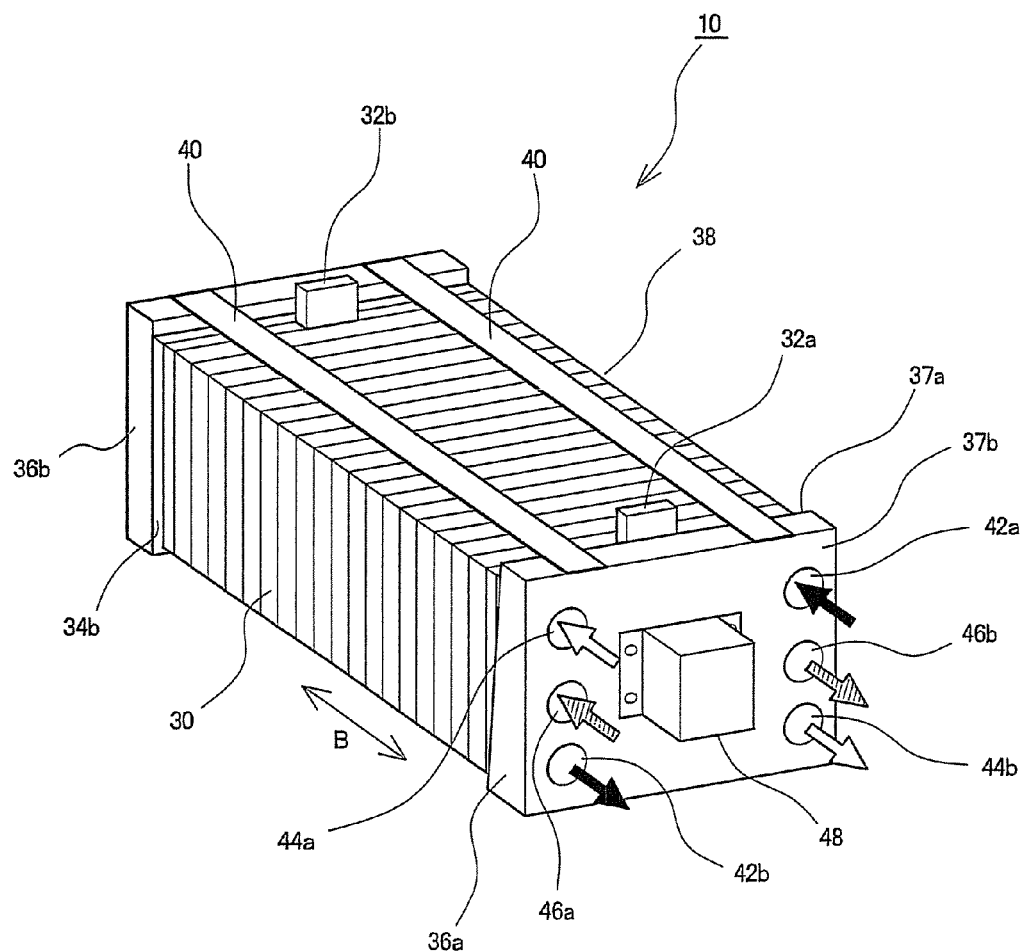
FIG. 2 is a perspective view of the fuel cell stack of FIG. 1.

FIG. 2 is a perspective view schematically showing a structure of the fuel cell stack 10. The fuel cell stack 10 is stored in a stack case made of sheet metal (not shown), and can be equipped or provided in an automobile or the like.

The fuel cell stack 10 comprises a cell stack 38 formed by stacking a plurality of fuel battery single cells 30 each formed by sandwiching an anode-side electrode, an electrolyte membrane, and a cathode-side electrode with separators and connecting the fuel battery single cells 30 in series. The cell stack 38 is sandwiched at both ends in the stack direction shown by an arrow B by a pair of current-collector plates 32a and 32b, a pair of insulating plates 34a and 34b (only one of which is shown in FIG. 2; refer to FIG. 3), and a pair of endplates 36a and 36b. The electric power generated by the plurality of fuel battery single cells 30 forming a part of the cell stack 38 is output from the pair of current-collector plates 32a and 32b.

The end plates 36a and 36b formed from stainless steel plates, for example, are connected at the upper portion and the lower portion by two strap-shaped members 40, respectively, and a tensile force is applied by the strap-shaped members 40 on the end plates 36a and 36b for sandwiching the cell stack 38. The ends of the strap-shaped members 40 are fixed on the end plates 36a and 36b by a suitable fixing means such as a screw.

In the fuel cell stack 10, in order to supply the fuel gas and oxidizing agent gas from the outside of the fuel cell stack 10 through pipes to the anode-side electrode and the cathode-side electrode of each fuel battery single cell 30, a fuel gas supply manifold 42a (upper right section of FIG. 2) and an oxidizing agent gas supply manifold 44a (upper left section of FIG. 2) which are formed through the cell stack 38 in the stack direction are formed. In addition, in order to discharge the supplied fuel gas and oxidizing agent gas from the anode-side electrode and the cathode-side electrode of each fuel battery single cell 30 to the outside of the fuel cell stack 10, a fuel gas discharge manifold 42b (lower left section of FIG. 2) and an oxidizing agent gas discharge manifold 44b (lower right section of FIG. 2) which are formed through the cell stack 38 in the stack direction are formed. Moreover, in order to suppress temperature increase due to heat generation by the electrochemical reaction in the fuel battery single cell 30, a coolant (for example, cooling water) is supplied from the outside of the fuel cell stack 10 to the fuel battery single cells 30. A coolant supply manifold 46a (middle left of FIG. 2) and a coolant discharge manifold 46b (middle right of FIG. 2) for supplying and discharging the coolant are formed through the cell stack 38 in the stack direction.

One end plate 36a of the end plates 36a and 36b has a stack-facing surface 37a which faces the cell stack 38, and a system component mounting surface 37b which is on the opposite side from the stack facing surface 37a. Ends of the above-described manifolds 42a, 42b, 44a, 44b, 46a, and 46b are opened in the system component mounting surface 37b of the one end plate 36a. A wide black arrow in FIG. 2 represents a direction of flow of the fuel gas, a wide white arrow in FIG. 2 represents a direction of flow of the oxidizing agent gas, and a wide arrow with hatched lines represents a direction of flow of the coolant. At an approximate center of the system component mounting surface 37b of the endplate 36a, system components such as a pump 48 and pipes 50-54 (refer to FIG. 3) are mounted.

As shown in FIG. 2, in the present embodiment, three openings of the manifolds 42a, 42b, 44a, 44b, 46a, and 46b are formed in a vertically aligned manner on each of the left and right sides of the endplates 36a, but the arrangement of the manifold openings is not limited to such a configuration and may be suitably changed according to the design of the manifolds for fuel gas, oxidizing agent gas, and coolant in the fuel cell stack 10. For example, the coolant manifolds 46a and 46b may be formed at upper and lower positions on the endplate 36a. In addition, each of the manifolds only needs to be formed through the cell stack 38 in the stack direction of the fuel battery single cells 30, and does not need to be formed in a straight line. Alternatively, each of the manifolds may be formed inclined with respect to the stack direction (direction of arrow B).

In FIG. 2, hydrogen which serves as the fuel gas supplied to the fuel gas supply manifold 42a flows in the stacked fuel battery single cells 30 along the surface of the anode-side electrode (power-generating surface) in a lateral direction (from right to left in FIG. 2). The anode-side electrode is formed to include a catalyst, and, when hydrogen flows along the surface of the anode-side electrode, a hydrogen atom is activated by the catalyst and releases an electron, to become a hydrogen ion. The hydrogen ion penetrates through the electrolyte membrane and moves to the cathode-side electrode. The electron which is released by the ionization of hydrogen becomes power generated by the fuel battery single cell.

Hydrogen which is not supplied for power generation in the fuel battery single cell 30 (that is, hydrogen which is not ionized) is discharged through the fuel gas discharge manifold 42b from the end plate 36a to the outside of the fuel cell stack 10.

Air including oxygen which serves as the oxidizing agent gas which is supplied to the oxidizing agent gas supply manifold 44a flows in the stacked fuel battery single cell 30 along the surface of the cathode-side electrode in an opposite lateral direction (from left to right in FIG. 2). The cathode-side electrode is formed to include a catalyst, and, when the air flows along the surface of the cathode-side electrode, an atom of the oxygen in the air is activated by the catalyst and becomes an oxygen ion. The oxygen ion chemically reacts with the hydrogen ion penetrating through the electrolyte membrane and moved from the cathode-side electrode, and water is produced. The air flowing along the cathode-side electrode in the fuel battery single cell 30 is discharged along with the reaction product water through the oxidizing agent gas discharge manifold 44b from the end plate 36a to the outside of the fuel cell stack 10.

The cooling water supplied from the end plate 36b to the coolant supply manifold 46a flows along a flow path formed between the stacked fuel battery single cells in the opposite lateral direction (from left to right in FIG. 2), and cools the fuel battery single cell 30 which is heated by the generated heat by the electrochemical reaction in the fuel battery single cell 30. Then, the cooling water is discharged through the coolant discharge manifold 46b from the end plate 36a to the outside of the fuel cell stack 10.

Figure 3:
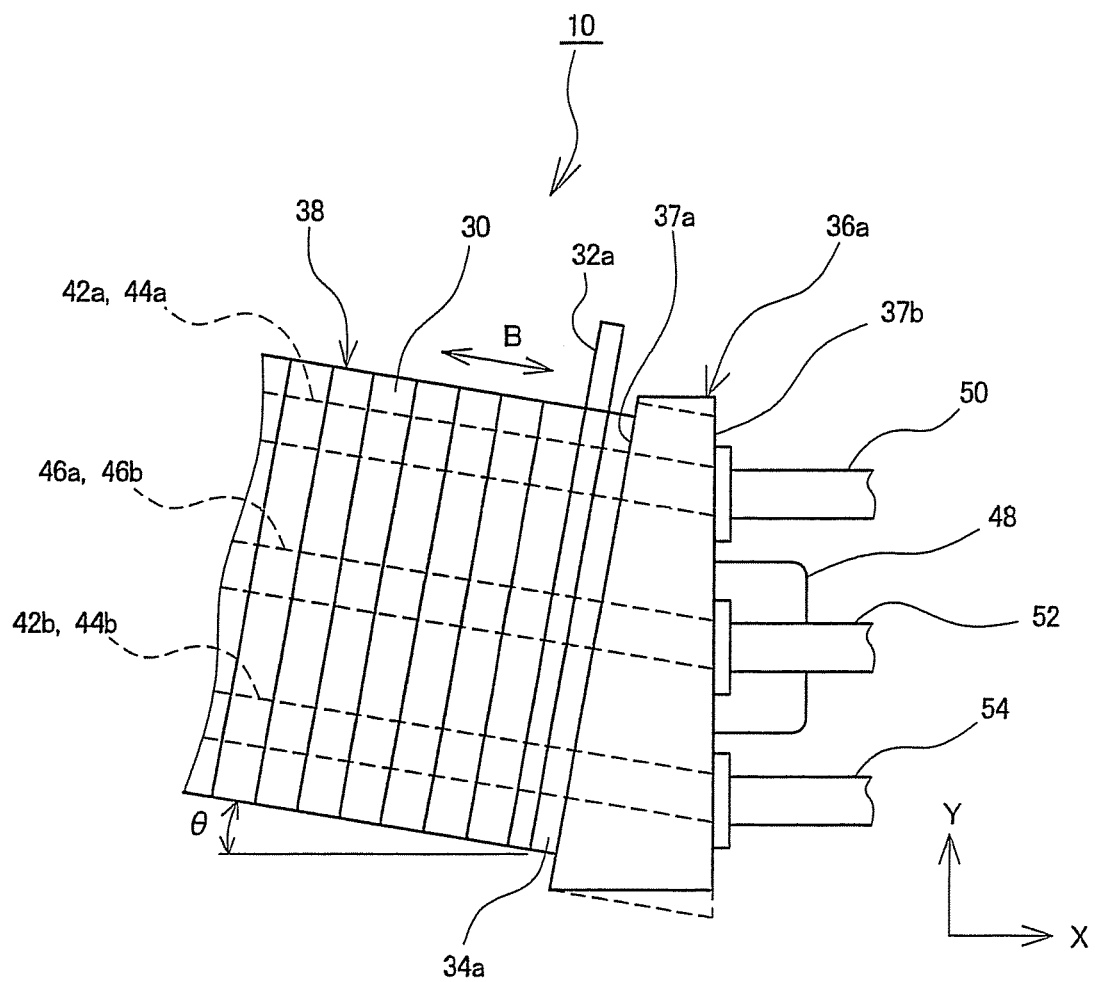
FIG. 3 is a partial side view of a fuel cell stack showing a side surface shape of one end plate in FIG. 2.

FIG. 3 is a diagram showing a side shape of the one end plate 36a in the fuel cell stack 10. In FIG. 3 (and similarly in FIGS. 4 and 5), the strap-shaped member 40 is not shown. As described above, the end plate 36a has the stack-facing surface 37a and the system component mounting surface 37b. Here, the endplate 36a is formed such that the system component mounting surface 37b is inclined with respect to the stack-facing surface 37a with an inclination angle $\theta$, and the side surface or the cross section in the vertical direction of the end plate 36a has a trapezoidal shape. With this structure, when the fuel cell stack 10 is placed such that the manifolds 42a-46b in the cell stack 38 have a downward inclination toward the one end plate 36a in order to achieve a superior water discharging performance, particularly, in the oxidizing agent gas discharge manifold 44b and the fuel gas discharge manifold 42b, the system component mounting surface 37b of the end plate 36a is placed along the vertical direction (direction of arrow Y).

With the end plate 36b formed in this manner, the system components such as the pump 48 and the pipes 50, 52, and 54 which are mounted on the one end plate 36b can be used in a normal orientation regardless of the inclined placement of the fuel cell stack 10, and the pump performance and water discharging performance of the system components can be maintained. Here, the "normal orientation" refers to a state where, for the pump 48, the pump 48 is mounted on the vertical surface and, for the pipes 50, 52, and 54, the pipes extend along the horizontal direction (direction of arrow X).

When a fuel cell stack in which the end plate is formed with a flat plate of a constant thickness is placed in an inclined state, the mounting orientation of the system components such as the pump, pipes, fuel gas injector, water discharge valve, pressure sensor, etc. mounted on the endplate is also inclined. Therefore, the design must be changed or the performance must be re-evaluated, including the related components around the system components (for example, the stack case). However, with the fuel cell stack 10 of the present embodiment, such design change and performance re-evaluation can be omitted.

Figure 4:
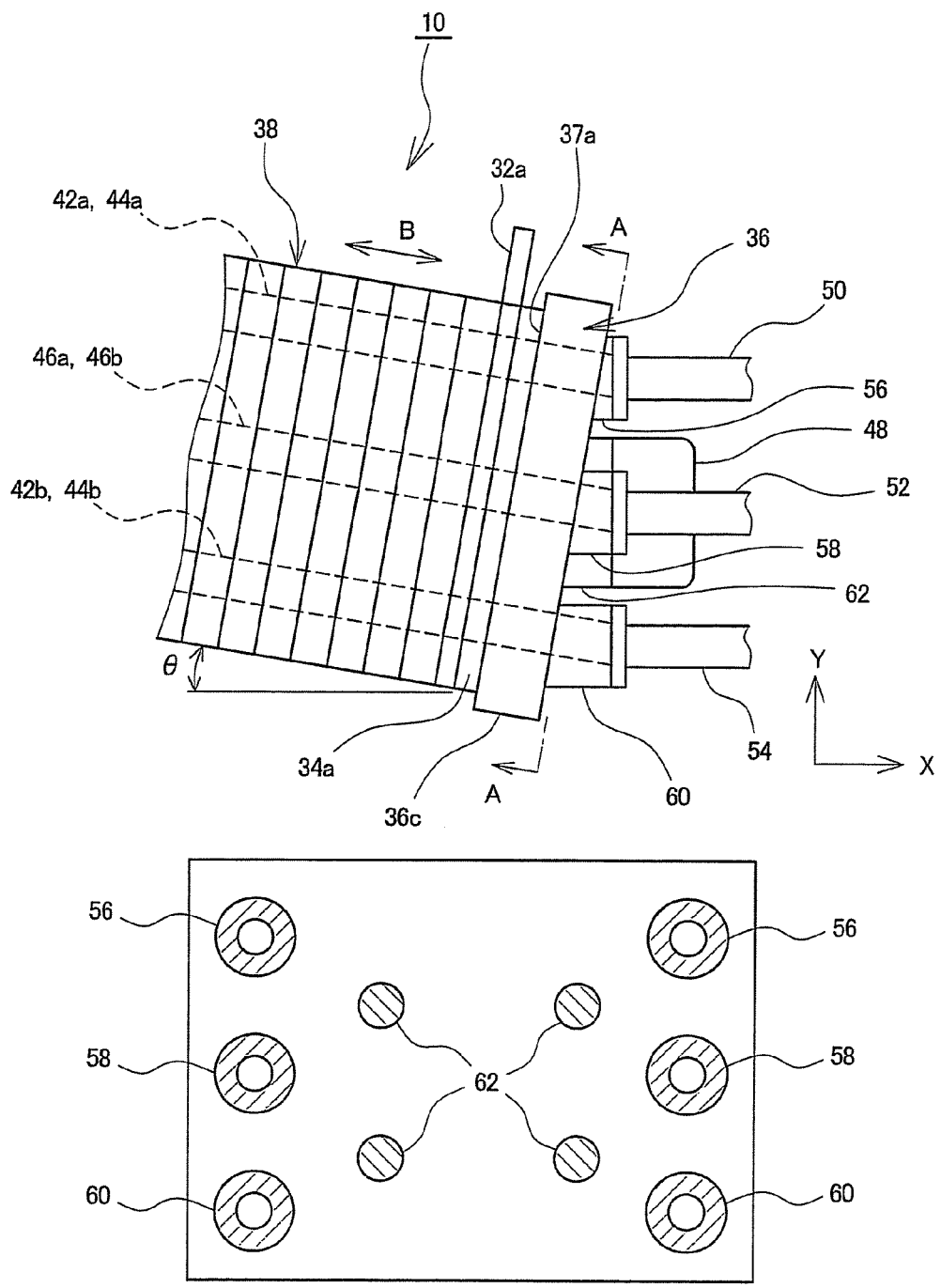
FIG. 4 is a partial side view of a fuel cell stack showing an alternative configuration of the end plate of FIG. 3 and an A-A line cross-sectional diagram of the end plate.

The upper and lower surfaces of the end plate 36a are formed along the horizontal direction. Alternatively, the upper and lower surfaces of the end plate 36a may be formed along the stack direction (direction of arrow B) of the fuel battery single cell 30, as shown by a dot-and-a-chain line. In addition, in the example configuration of FIG. 3, the end plate 36a having the plate shape has an overall trapezoidal cross sectional surface. Alternatively, there may be employed a configuration as shown in FIG. 4 in which only pipe-mounting portions 56, 58, and 60 for the tip flange sections of the pipes 50, 52, and 54 and pump-mounting portions 62 for the pump 48 are provided projecting in an approximate circular pillar shape (or approximate polygonal pillar shape) having a side surface or cross section of a trapezoid on a flat plate section 36c of a constant thickness and the tip surfaces of the mounting sections 56-62 may be inclined with the inclination angle θ, to form the system component mounting surfaces. The mounting portions 56, 58, 60, and 62 form the system component mounting section, and a female screw hole for mounting the system component is formed at the tip surface of the system component mounting portion. With such a structure, the weight of the end plate 36a, and, consequently, that of the fuel cell stack 10, can be reduced.

Figure 5:
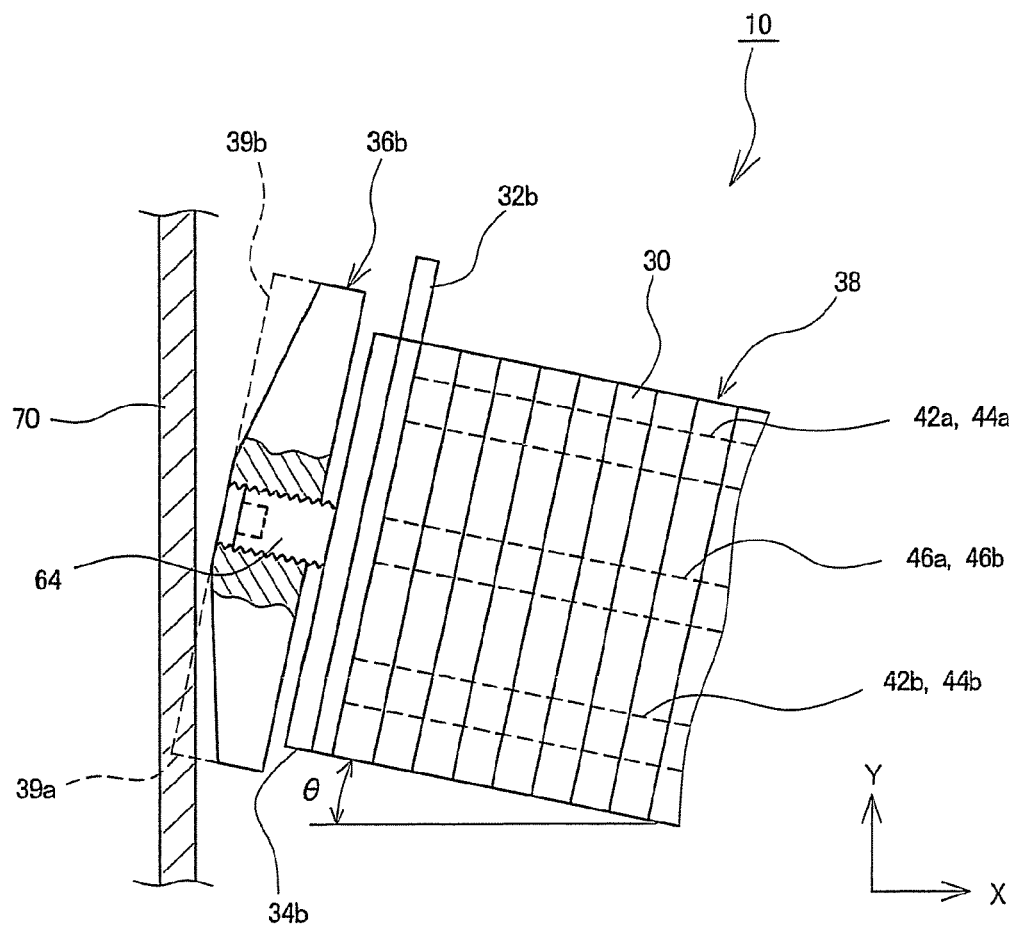
FIG. 5 is a partial side view of a fuel cell stack showing a side shape of the other end plate in FIG. 2.

FIG. 5 is a diagram showing a side shape of the other end plate 36b. The end plate 36b is formed, for example, by beveling, through cutting, and removing a lower side corner 39a and an upper side corner 39b of a stainless steel plate of constant thickness. A screw 64 for adjusting the pressure-contact load of the stacked fuel cell stack is incorporated at the center of the end plate 36b, and a tip of the screw 64 abuts on the insulating plate 34b.

With removal of the lower side corner 39a of the end plate 36b, there can be inhibited an increase the size, in the horizontal direction (X direction), of the fuel cell stack 10 which is placed in an inclined state, and a stack case 70 which is designed to store the fuel cell stack in a horizontally placed state can be used as it stands. With removal also of the upper side corner 39b, a superior balance of the end plate 36b can be achieved, and the weight of the end plate 36b, and, consequently, that of the fuel cell stack 10, can be reduced.

In the above-described fuel cell stack 10, the supply and discharge of the fuel gas, oxidizing gas, and coolant is executed with the same end plate. However, the present invention can be applied also to a fuel cell stack of a type in which the fuel gas or the like is supplied through one (or upper side) end plate and discharged from the other (or lower side) end plate.

The invention claimed is:

1. A fuel cell stack comprising a cell stack in which a plurality of fuel battery single cells are stacked, a pair of end plates which sandwich the cell stack from respective sides in a stack direction, and a system component which is mounted on one end plate, and in which there is formed a manifold that extends in and through the cell stack in the stack direction and for supplying and discharging a fuel gas or an oxidizing agent gas for each of the fuel battery single cells, wherein the one end plate has a stack-facing surface which faces the cell stack and a system component mounting surface on a side opposite of the stack facing surface, and a system component mounting portion for mounting the system component being formed in a projected manner on the system component mounting surface, and the system component mounting portion has a trapezoidal side surface with a tip surface of the system component mounting portion having an inclination angle with respect to the stack-facing surface so that, when the fuel cell stack is placed such that the manifold has a downward inclination toward the one end plate, the surface of the system component mounting portion is oriented along a vertical direction, wherein the system component includes at least a pump and a pipe.

2. The fuel cell stack according to claim 1, wherein the one end plate is composed of a flat plate section having a constant thickness on a surface of which the system component mounting portion is formed in a projected manner.

3. The fuel cell stack according to claim 1, wherein a lower side corner of the other end plate of the pair of end plates is removed.

4. The fuel cell stack according to claim 1, wherein an upper side corner of the other end plate of the pair of end plates is removed.

* * * * *